May 7, 1963  A. G. THOMAS  3,089,069
STEP MOTOR AND CONTROLS
Filed Dec. 24, 1957  2 Sheets-Sheet 1
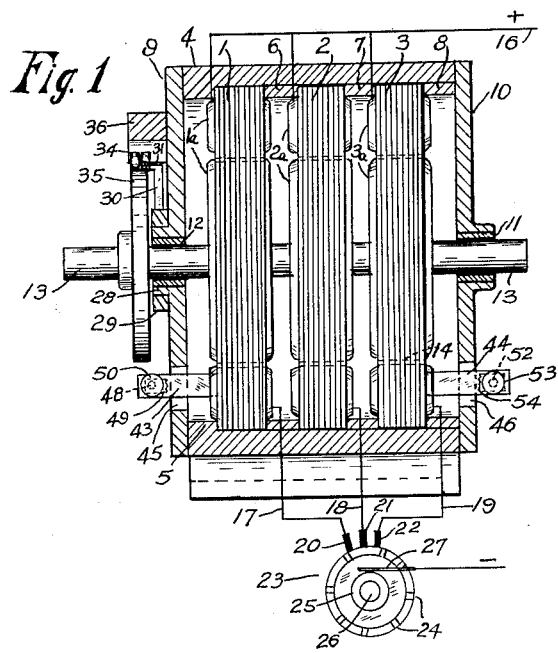
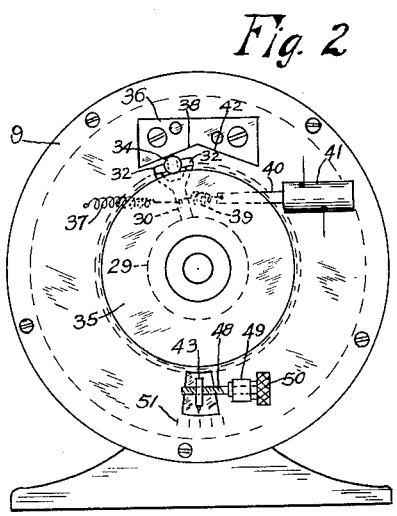
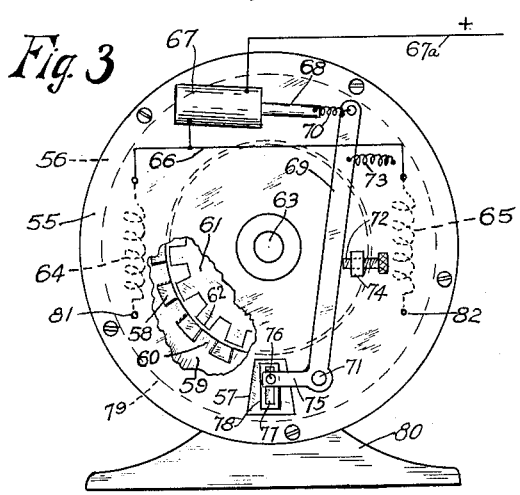
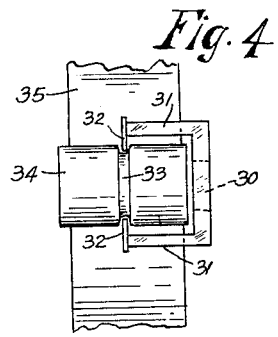
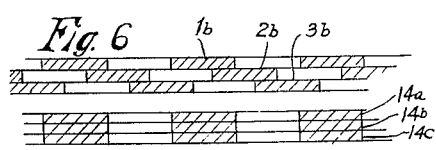
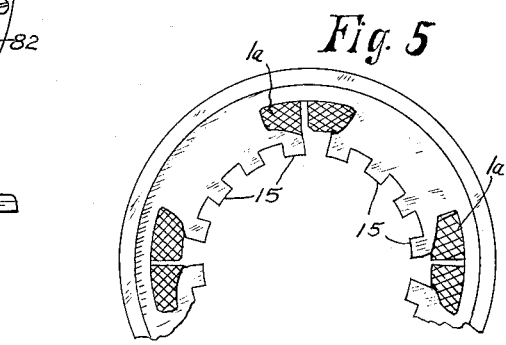
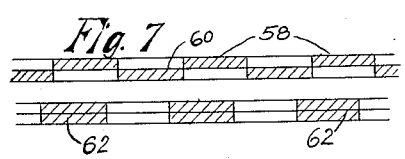
INVENTOR.
Albert G. Thomas

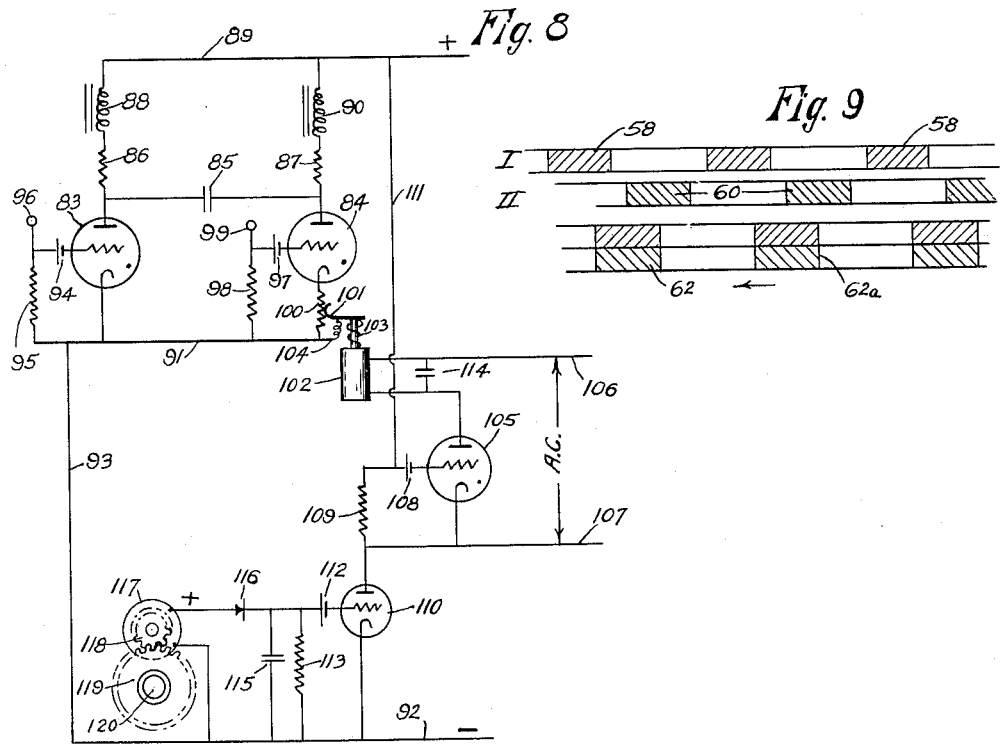
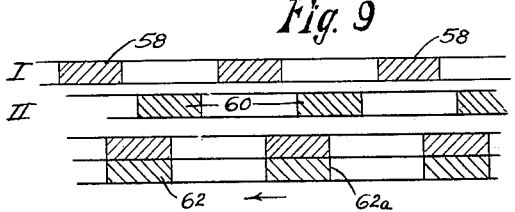
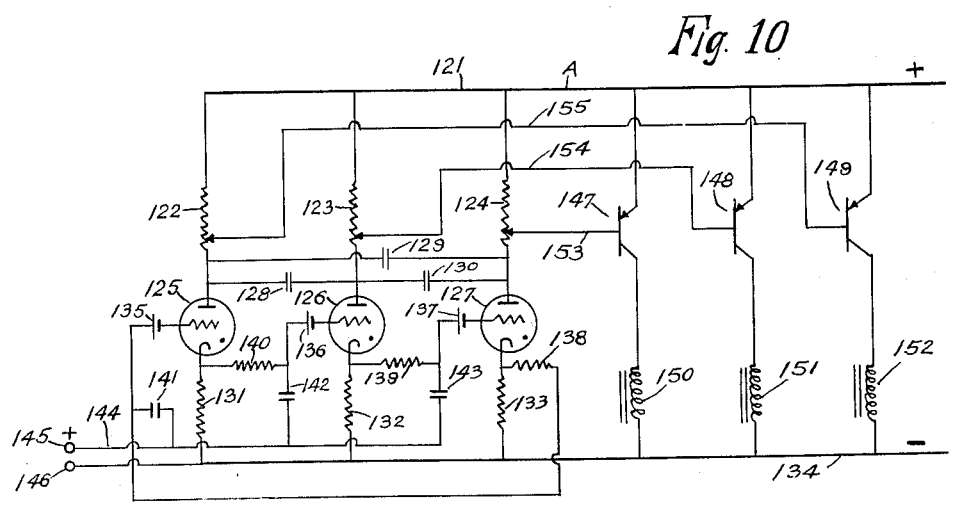

United States Patent Office 3,089,069
Patented May 7, 1963

3,089,069
STEP MOTOR AND CONTROLS
Albert G. Thomas, Charlottesville, Va., assignor to Industrial Controls Corporation, Chattanooga, Tenn., a corporation of Tennessee
Filed Dec. 24, 1957, Ser. No. 704,919
15 Claims. (Cl. 318—138)

This invention relates to step motors and is a continuation-in-part of inventions described in my issued Patents Nos. 2,774,922; 2,782,354; 2,787,719; 2,806,987; and 2,808,556.

In operating step motors of the general type described in the above patents, I have found that there is a tendency for the motors to take alternate short and long steps. This is due to the fact that the motor brake holds the rotor in its most advanced position for any step and if the rotor teeth start with only a small overlap of the stator teeth, the resultant step will be long and the rotor teeth will be locked by the brake in positions considerably beyond aligned position of the rotor and stator teeth. This will cause a large relative overlap of the stator and rotor teeth of the next phase and, accordingly, the next step will be short, and so on. The disparity of step movements will vary to some extent with the load and there is, conceivably, some optimum load for which the steps will be substantially equal.

It is an object of this invention to provide a step motor the steps of which will be substantially equal.

Another object is to provide a step motor which will rotate in substantially equal steps under varied loads.

A further object is to provide a plural phase step motor in which stator or rotor poles may be relatively positioned to produce substantially equal step movements.

An additional object is to provide a three phase step motor the poles of at least two phases of which may be relatively positioned.

Another object is to provide a two phase step motor having means for positioning poles of one phase relative to poles of the other phase.

An additional object is to provide a plural phase step motor having means for adjusting relative positions of the poles of the stators.

Another object is to provide a two phase step motor having means for positionally adjusting the poles of one stator with relation to poles of the other stator.

A still further object is to provide a step motor having a plurality of phases and means for relatively positionally adjusting poles of the phases in order to cause the motor to produce maximum torque.

A further object is to provide a plural phase step motor having means for automatically relatively positionally adjusting poles of the phases in accordance with load on the motor.

Another object is to provide a combination thyratron-transistor circuit for controlling step motors.

Other objects will be evident in the following description:

In the drawings:
FIGURE 1 is a front elevation, in part section, of a step motor having three phases, two of which have adjustable stator poles.

FIGURE 2 is a left end view of the motor of FIGURE 1.

FIGURE 3 is an end view of a two phase step motor having automatically adjusted stator poles of one phase.

FIGURE 4 is a fragmentary top plan view of the brake disc and roller mechanism of the motor of FIGURE 1.

FIGURE 5 is a fragmentary face view of a stator unit showing group windings in section for the stator poles.

FIGURE 6 is a diagram showing relative positional phasing of the stator and rotor poles of the motor of FIGURE 1.

FIGURE 7 is a diagram showing the relative positional phasing of the rotor and stator poles of the motor of FIGURE 3.

FIGURE 8 is a circuit diagram for a step motor system in which the degree of energization of a phase of the motor is adjusted automatically according to motor load.

FIGURE 9 is a diagram showing positional phasing of poles of a step motor for producing equal step movements of the rotor.

FIGURE 10 is a diagram of a circuit in which relatively small thyratrons are used to control power transistors controlling current to motor windings, or for other purposes.

In FIGURE 1, laminated stator units 1, 2, and 3, are mounted in casing ring 4 which has shoulder 5. Spacer rings 6, 7, and 8 are inserted as the circular stator units are assembled and serve to maintain the stator units in axially aligned position. The central unit 2 is fixed to the casing by means of suitable screws, or in other manner. The end units 1 and 3 are rotatable about their axis. End bells 9 and 10 are fastened to ring 4 by means of bolts or screws. These end bells have aligned bearings 11 and 12 supporting shaft 13 which carries rotor 14. This rotor has three sections or phases. The teeth or poles of the rotor phases may be equal in circumferential width to the spaces therebetween but this is not essential.

The stator teeth or poles may be similarly spaced. The rotor teeth for the three phases may be aligned and the stators displaced relatively so that when any stator phase is energized the rotor teeth of the next phase to be energized are brought in suitable overlapping position with respect to the associated stator teeth. The general spacing and arrangement of the rotor and stator teeth for one phase is indicated in FIGURE 3 which represents a two phase motor but may also represent one phase of a three phase motor.

Referring to FIGURE 1 again, stator windings 1a, 2a, and 3a for the respective stator phases 1, 2, and 3 are wound in suitable stator slots, and encompassing in effect, groups of stator teeth. This construction is shown in FIGURE 5 in which the windings 1a surround groups of teeth 15 which may be magnetized north and south in alternate groups. The windings are shown in cross section and may be connected in series, parallel, or series-parallel, for any stator unit. This type of winding provides strong magnetization.

One terminal of each of the phase windings is connected with positive line 16 which may be connected to the positive terminal of a generator, battery, rectifier, or other source of direct current. The other terminals of windings 1a, 1b, and 1c are connected with respective conductors 17, 18, and 19 which respectively are connected to brushes 20, 21, and 22 suitably supported in contact with commutator 23 having a plurality of equally spaced metal contacts 24 which are electrically connected with slip ring 25 mounted on the commutator face coaxially therewith. The commutator is mounted on shaft 26 which is suitably supported and which may be rotated manually or by means of a motor or the equivalent. The slip ring and commutator are preferably insulated from the shaft. Brush 27 is in contact with slip ring 25 and is connected with the negative terminal of the source of power.

Hub or ring 28 extends from the face of end bell 9 and rotatably supports ring 29 having integral arm 30 from which a pair of arms 31 extend. These arms carry narrow fingers 32 which engage groove 33 around the circumference of hardened roller 34 mid-way thereof. This construction is shown clearly in FIGURE 4. The roller rides on the peripheral surface of hardened disc 35 which is keyed to shaft 13. Inverted V-shaped cam 36 is fastened to end bell 9 by means of screws and dowels are preferably used to hold the double cam accurately in position, as indicated in FIGURE 2. Tension spring 37 is attached to arm 30 and to end bell 9 and normally pulls the arm over so that roller 34 is pressed against cam surface 38 and disc 35 to lock the disc and shaft against rotation in counterclockwise direction but allowing substantially free rotation in opposite direction.

Tension spring 39 is attached to arm 30 and to the adjacent end of armature or plunger 40 of solenoid 41 which is attached to the face of end bell 9. Spring 39 is of stiffer construction than spring 37. When solenoid 41 is connected in a suitable energizing circuit the plunger is pulled into the solenoid thereby pulling arm 30 over until roller 34 is wedged between disc 35 and cam surface 42 thereby locking disc 35 against rotation in clockwise direction but allowing substantially free rotation thereof in opposite direction. The angle between cam surfaces 38 and 42, and the distance between the cam and disc are chosen, in conjunction with the diameter of the roller, to provide reliable locking and releasing action. The application of force to the center of the roller allows the latter to rock and thus to align itself with the disc and cam surfaces. It is obvious that a solenoid could be substituted for spring 37.

Referring to FIGURES 1 and 2, arm 43 is welded or riveted to stator unit 1 and similar arm 44 is similarly attached to stator unit 3. These arms project through respective windows 45 and 46 in end bells 9 and 10. Threaded shank 48 is rotatably supported in post 49 attached to end bell 9 (FIGURE 2) and is screwed through threaded arm 43. Knurled knob 50 is integral with screw 48. Scale 51 is provided on end bell 9 so that a pointer projecting from arm 43 may be set with respect to the scale. Screw 52 having attached knob 53 (FIGURE 1) is similarly mounted in post 54 shown in fragmentary manner. This post is attached to end bell 10 and screw 52 is threaded into arm 44. It will be seen that the angular positions of stator units 1 and 3 may be adjusted relative to stator unit 2 by turning screws 48 and 52. Stator unit 2 is fixed in position by means of a suitable key or screw passing through casing 4.

The normal phasing of the rotor and stator teeth is indicated in FIGURE 6 which diagrammatically shows the rotor teeth 14a, 14b, and 14c in alignment and stator teeth 1b, 2b and 3b overlapping by ⅓ circumferential tooth width. The stator units 1 and 3 may be shifted angularly by rotating screws 48 and 52 in order to make the steps nearer equal or to improve the torque by causing the initial overlap of stator and rotor teeth for the various phases to approach equality. The stator units 1 and 3 ar rotatable in casing 4 and are held in angular position by screws 48 and 52. These screws could be mechanically associated, if desired, so that only one adjustment need be made.

In FIGURE 3 a two phase step motor is shown. This motor has a brake similar to the one described for the three phase motor of FIGURES 1 and 2. The brake for the two phase motor is on the opposite end of the motor from that shown in FIGURE 3. The two phase motor is constructed in the same general manner as previously described but the relative positioning of the stator teeth is different. End bell 55 is screwed to the motor casing 56, the end bell having cut-out or window 57. There are two stator phases or sections, one having teeth or poles 58 and the other stator unit 59 having teeth or poles 60. The end bell is shown broken away to reveal the stator and rotor poles.

There are two rotor units similar to unit 61 shown. These units have rotor teeth in alignment. In the drawing the teeth of the second rotor unit are hidden by teeth 62 of unit 61. The rotor units are mounted on shaft 63 rotatable in bearings in end bell 55 and in an opposite end bell. The rotor units are axially aligned with the two respective spaced stator units. The circumferential widths of the stator and rotor teeth are shown as being approximately equal to the circumferential widths of the spaces between the teeth but rigid adherence to this relationship is not essential. As indicated, the stator teeth 58 of one phase are in approximate alignment with the spaces between the teeth 60 of stator unit 59.

The teeth of the stators may be wound individually, alternately, or in groups as shown in FIGURE 5. The two phase windings are indicated diagrammatically by coils 64 and 65, one end of each being connected by conductor 66 to a terminal of solenoid 67 which is attached to end bell 55. The other terminal of this solenoid is connected with positive line 67a. Plunger 68 is movable in the solenoid and is fastened to the end of arm 69 by means of relatively stiff spring 70. This arm is pivoted to the end bell at 71 and is pulled against stop screw 72 by means of tension spring 73 fastened to the arm and to the end bell 55. Screw 72 is threaded into a hole in lug 74 projecting from the end bell.

Short arm 75 is integral with arm 69 and carries pin 76 which is slidable in slot 77 in block 78 attached to stator unit 59. Therefore, as arm 69 is rotated through an angle about pivot 71 the pin 76 is moved through an arc and moves block 78 and attached stator unit 59 through an angle about the axis of shaft 63 which is concentric with the circular periphery 79 of the stator unit. The unit 59 is mounted for angular rotation in casing 56 in the same manner as units 1 and 3 of FIGURE 1. Movement of pin 76 can readily swing the stator unit 59 through an arc but, due to the angles involved, the stator unit cannot move the pin and attached arm 75. Thumbscrew 72 can be adjusted to act as a stop for arm 69 for optimum results with respect to torque or even steps. Base 80 may be integral with or attached to casing 56.

The terminals 81 and 82 of respective windings 64 and 65 may be connected to distributing brushes of a suitable commutator, or to thyratrons or other current control devices as shown in Patents Nos. 2,774,922 and 2,806,987. When this motor is operated the current for both phase windings will pass through the solenoid and this solenoid may be designed, in conjunction with the tension of the springs, the lever arms, and other factors so that the angular position of stator unit 69 will be automatically adjusted with changing load more or less to compensate so that the steps in both phases will be nearer equal than would otherwise be the case. Step motors normally have a tendency to take alternate short and long steps, particularly for varying loads and the above described means is for the purpose of alleviating this condition as well as to provide approximately equal torque for the two phases. An additional advantage is that the automatic stator phasing can be arranged also to produce maximum torque for each step movement of the rotor. The rotor units could be adjusted positionally but it is preferable to shift the stator units.

FIGURE 7 illustrates the positional phasing of the stator and rotor teeth of the motor shown in FIGURE 3. The rotor teeth 62 of the two phases are shown in alignment and the stator teeth 58 of one stator phase are positioned so that they substantially bridge the spaces between teeth or poles 60. The stator unit having teeth 58 may be fixed and stator unit 59 may be shifted angularly about the motor axis.

In FIGURES 3, 6, and 7 the tooth widths are shown equal to the spaces between the teeth but this construction may be varied. In some cases it may be desirable, for instance, to have the spaces between the teeth greater than the tooth widths, or vice versa, for producing more uniform steps or better torque. The optimum spacing or other arrangement of the teeth will be determined, in part, by the load and intensity of magnetization since these affect the degree to which the rotor units will swing past aligned positions with respect to the associated stator units. By adjusting the positional phasing of the stator units, and determining the optimum spacing and width of the rotor and stator teeth for any given load, the motor steps can be equalized for all practical purposes. Furthermore, the steps may be approximately equalized by varying the degree of magnetization for various loads; particularly if the stator teeth are also shifted as described. Another method of equalizing the steps for the various phases is to supply stronger magnetization to one phase than to another, by means of more turns of wire or greater current. Then an added accelerating force is provided for the phase which would otherwise produce a short step and the magnetizing current can be adjusted until the steps are equal. If circuits of this type are used it is desirable to start the motor on the same phase each time the motor is initially energized.

In FIGURE 8 the anodes of thyratrons 83 and 84 are connected by condenser 85 which, in conjunction with resistors 86 and 87, serves to extinguish either conducting thyratron when the other is fired. Resistor 86 is connected between the anode of thyratron 83 and positive line 89, in series with field winding 88 of one phase of a two phase step motor which may be generally similar to the motor shown in FIGURE 3, or it may be similar to the motor described in my Patent No. 2,808,556. Field winding 90 of the other phase of the motor is similarly connected to resistor 87 between positive line 89 and the anode of thyratron 84.

The cathodes of the two thyratrons are connected to bus bar or conductor 91 which is connected to negative line 92 by means of conductor 93. Battery or other source of bias potential 94 is connected between the grid of thyratron 83 and resistor 95 the other end of which is connected to conductor 91. Source 94 normally biases this grid negatively to prevent firing. Terminal 96 is connected to the junction of the positive pole of potential source 94 and resistor 95. Positive pulses for firing thyratron 83 are applied to terminal 96, the associated negative firing connection being made to conductor 91 or negative line 92. Similarly, potential source 97 is connected between the grid of thyratron 84 and resistor 98 which is connected between conductor 91 and positive firing terminal 99 for thyratron 84, source 97 normally biases thyratron 84 negatively to prevent firing thereof.

Resistor 100 is connected between the cathode of thyratron 84 and conductor 91 and slidable contact 101, movable over this resistor, is attached to the plunger of solenoid 102. Compression spring 103, surrounding the plunger, normally holds the slidable contact at predetermined position on resistor 100. Flexible conductor 104 connects contact 101 with negative conductor 91 so that the slide provides a variable shunt connection. If desired, the resistor 100 may be disconnected from conductor 91, providing a series connection. It is preferable that contact 101 be insulated from the solenoid plunger and spring. This spring may have an associated threaded nut adjustment on the plunger so that the normal position of the contact on resistor 100 may be altered. While a linear type resistor and solenoid are indicated, the construction may be of rotary type, or any suitable device may be used to change the resistance in series with thyratron 84, such as a magnetically controlled variable resistor, or the like.

Solenoid 102 is connected in series with thyratron 105 and alterating current lines 106—107. Potential source 108 is connected to resistor 109 and to the grid of thyratron 105 normally to bias this thyratron negatively. The other end of resistor 109 is connected to alternating current line 107 and to the anode of evacuated tube 110, the cathode of which is connected to negative line 92. Positive line 89 is connected to resistor 109 by means of conductor 111. The negative terminal of potential source 112 is connected to the grid of tube 110 and the positive terminal of this source is connected to resistor 113, the other end of which is connected to negative line 92. Condenser 114 may be connected across the terminals of solenoid 102 to produce smooth action. Condenser 115 is preferably connected across resistor 113 which is also connected to the negative terminal of diode 116, the positive terminal of which is connected to the positive terminal of small direct current generator 117 suitably mounted on the motor and having pinion 118 fastened to the generator shaft. This pinion is in mesh with larger gear 119 fastened to shaft 120 of the step motor whose windings are indicated at 88 and 90. Generator 117 may be a very small, easily accelerated type which will produce voltage pulses of say 100 to 200 volts although lesser voltage pulses could be used. Conductor 111 could be connected to a separate source of direct current, the negative terminal of which can be connected to line 107.

In operation, the cathodes of the various tubes are suitably energized and lines 89 and 92 are connected to a direct current generator, rectifier, or other source of direct current. Alternating current lines 106 and 107 are connected to 60 cycle alternating current mains or to a source of higher frequency. Thyratrons 83 and 84 are normally biased negatively to prevent conduction but when positive pulses from a commutator, oscillator, or switch, or the equivalent, are applied to terminals 96 and 99, alternately, the two thyratrons will be fired alternately if the pulses are of sufficient amplitude to overcome the negative bias. As previously described, when either thyratron is fired the other conducting thyratron is extinguished, through the agency of condenser 85 and associated impedances. The negative terminal of the pulse source is connected to conductor 91.

In the normal operation of this two phase motor there will be alternate short and long steps due to the overswing of the rotor past in-register position of the rotor and stator teeth which, preferably, are equal in number and spacing. It is assumed that a brake similar to the brake shown in FIGURE 2 is used with this motor. Therefore this brake holds the rotor in its advanced position and the next step will therefore be short since the accelerating force will be less for a considerable overlap of the rotor and stator teeth. The short step will produce a small overlap for the other phase and so the ensuing step will be long, and so on, repeatedly.

The variable resistor 100 may be associated with the thyratron supplying current for either the long step or the short step but assume that the thyratron 84 supplies current for the long step. Now, for a predetermined current through resistor 109 and tube 110 the net or effective negative bias of the grid of thyratron 105 will be a predetermined voltage and the periodic half waves from A.C. line 106, when positive, will cause thyratron 105 to conduct when the anode voltage rises to the value corresponding to the net negative bias voltage which is effective. Current from line 89 passes through resistor 109 and tube 110 and reduces the negative bias of thyratron 105 in proportion to the magnitude of the current. The less the negative bias the lower is the anode potential at which this thyratron will fire. Therefore the effective portions of the positive half cycles of the alternating current passing through solenoid 102 can be varied in accordance with the current passing through tube 110. This current is varied in accordance with the potential of the grid of tube 110.

When the motor is rotating step-by-step the shaft 120 is given a succession of relatively short angular rotations. The rate of change of rotational velocity or the acceleration of the shaft will produce proportional voltage outputs of generator 117. For light loads or no load on shaft 120 the step acceleration rate will be relatively rapid, causing relatively high D.C. voltage output of generator 117 and heavy loads of the motor will cause shaft 120 to be accelerated at a slower rate for each step and consequently generator 117 will produce pulses of less voltage. Therefore the D.C. voltage peaks produced by the generator are a measure of the load on the motor and these peaks are applied to condenser 115 which acts as an accumulator for the pulses so that a relatively smooth current flow from the condenser passes through resistor 113 in a direction tending to oppose the negative bias of potential source 112. The net bias of tube 110 and the current flow therethrough are, therefore, proportional to the load on the motor. Consequently the average current passing through the solenoid and thyratron 105 is varied as the motor load is varied. The solenoid plunger will therefore compress the surrounding spring and will position slide contact 101 in proportion to the motor load and this movement will insert more resistance in circuit with thyratron 84 as the motor load is reduced, since a greater positive potential is then applied to the resistor 113 resulting in more current flow in tube 110 and more average current in thyratron 105. The various components can be so chosen that the desired degree of compensation is provided to make the motor steps substantially equal for a wide variety of load conditions. This can be done as described since the reduced current flowing through motor winding 90 will reduce the degree of acceleration given the rotor and consequently the amount of overswing of the rotor past aligned or in-register position will be lessened. Rectifier or diode 116 may be placed in the circuit to prevent condenser 115 from discharging back through the generator. While a two phase motor is described, the same principles may be applied to a three phase motor.

The spacing between the teeth, both stator and rotor, may be approximately equal to the width of the teeth and the phasing of the stator or rotor teeth may be as described in Patent No. 2,808,556, and in connection with FIGURE 7. In this case the rotor teeth for one phase substantially bridge the spaces between the rotor teeth of the other phase. This construction, however, produces alternate short and long steps, if compensation is not provided. In FIGURE 9 is shown an arrangement of the poles which will provide equal steps for a given load on the motor. The same numerals as in FIGURE 7 will be used, the aligned rotor teeth being indicated by the numerals 62 and the respective positionally phases stator teeth being indicated by the numerals 58 and 60.

In this case assume that the rotor teeth 62 initially overlap the stator teeth 60 of phase II by ¼ tooth width and that the magnetization and motor load are such that the rotor teeth are snapped forward until the trailing edges 62a of the rotor teeth are in alignment with the centers of the stator teeth 60 of phase II, as indicated. Now if the spacing of the teeth is such that the leading edges of the rotor teeth then overlap the trailing edges of teeth 58 of phase I by ¼ tooth width, the steps for each phase will be equal. In order for this condition to be true the spaces between the teeth should be seprated so that their leading edges, say, are spaced by 2½ tooth widths. Assume that $W$=circumferential width of stator and rotor teeth. Then, under the conditions stated, the rotor teeth move $¾W+½W=5⁄4W$ for each step. In order to bring the same rotor phase back to the starting position with its teeth overlapping the associated stator teeth by ¼W it is necessary for the rotor to take two steps or $2×5⁄4W=2½W$. Therefore the leading edges of the teeth, or trailing edges, should be separated by a circumferential distance equal to 2½ times the tooth width which in this case is assumed to be the same for both rotors and stators. Since the rotor teeth of the two phases are in line the stator teeth of these phases should be positionally phased so that energization of one phase should cause the rotor teeth of the other phase to overlap the associated stator teeth by ¼ tooth width or W/4. In this case the centerlines of the teeth 60 will coincide with the center lines of the spaces between the teeth 58. In generally similar manner the teeth may be spaced to produce equal steps for other load and magnetization conditions. Equalization of the steps of a three phase motor may likewise be arranged. Pulses may be taken off the motor windings for monitoring the circuit since these pulses will vary with the rate of "snap-in" of the rotor teeth with respect to the stator teeth, due to back E.M.F. The motor may be started on the same phase each time.

In FIGURE 10, positive line 121 is connected with resistors 122, 123, and 124 leading to the anodes of small thyratrons 125, 126, and 127, respectively. These may be relatively small thyratrons passing a few hundred milliamperes or less, for controlling transistors of 10 or more amperes current carrying capacity. Condensers 128, 129, and 130 are connected across the three thyratron anodes, as indicated, and, in conjunction with resistors 122, 123, and 124, serve to cause extinction of any conducting thyratron when any other thyratron of the three is fired. Resistors 131, 132, and 133 are connected to the cathodes of thyratrons 125, 126, and 127, respectively, and the other ends of these resistors are connected to negative line 134. The negative poles of bias batteries or other potential sources 135, 136, 137 are connected to the grids of the respective thyratrons and the positive poles or terminals of these bias sources are connected, respectively, to the ends of resistors 138, 139, and 140, the other ends of which are connected to the respective cathodes of tubes 127, 126, and 125. Relatively small condensers 141, 142, and 143 are connected between conductor 144 and the positive terminals of bias sources 135, 136, and 137 as shown. Terminal 145 is connected with conductor 144 and terminal 146 is connected to negative line 134.

The above described circuit comprises a well known counting circuit which can be operated at fast switching rates, particularly if condensers 128, 129, and 130 are not too large. For small thyratrons passing a few hundred milliamperes of current, these condensers may be of approximately 0.1 to 1 mfd. capacitance and resistors 122, 123, 124 may be from 50 to 1000 ohms resistance but these are not intended as limiting values. Resistors 131, 132, and 133 should be of sufficient resistance to provide the proper degree of change of negative bias for the next thyratron to be fired and resistors 138, 139, and 140 should be such that the potential pulses applied to the grid circuits will cause firing of the "sensitive" tube or the one having less negative bias. Capacitances 141, 142, and 143 may be .1 mfd. or less. This ring circuit may be made to count or fire the thyratrons in sequence by applying current pulses from an oscillator, commutator, or other source, to terminals 145 and 146, the positive pulses being connected to terminal 145. The potential of these pulses should be sufficient to overcome the net negative bias of the most "sensitive" tube but not sufficient to fire all of the thyratrons simultaneously.

Transistors 147, 148, and 149 are connected so that their respective collectors lead to motor phase windings 150, 151, and 152 of a three phase step motor which may be similar to the motor shown in FIGURE 1. The remaining ends of windings 150, 151, and 152 are connected to negative line 134. The emitters of these transistors are connected to positive line 121 but a separate source of positive potential may be used for the transistors if desired. The base of transistor 147 is connected to the low potential end of resistor 124 by conductor 153; the base of transistor 148 is connected to the low potential end of resistor 123 by conductor 154 and the base of transistor 149 is connected to the low potential end of resistor 122 by conductor 155.

It will be seen that current flow through resistor 122 will apply a potential difference across the emitter and base of transistor 149 to cause this transistor to conduct current through winding 152, and similarly, current flow through resistors 123 and 124 will cause current flow through respective transistors 148 and 147 and connected motor phase windings 151 and 150. Therefore, if the components are properly chosen the relatively small thyratron currents will control the relatively large transistor currents passing through the respective motor phase windings 150, 151, and 152. These small thyratrons can be fired and extinguished at very fast speeds as compared to some larger thyratrons and they have the advantage that current through one thyratron is maintained until another thyratron is fired. In this way the current through any of the three transistors and associated motor winding is maintained until the next succeeding motor winding is energized. This prevents drift of the motor. When any of the thyratrons is extinguished the current through the associated anode resistor ceases and the associated transistor ceases to conduct any appreciable current through its collector and connected motor winding. The conductor 121 may be broken at point A and separate sources of direct current potential for the thyratrons and transistors may be provided. The negative lines of the two sources may be connected but the positive lines would be separate.

By using the small control thyratrons in conjunction with power transistors it is possible to provide a small step motor control unit since the components associated with the thyratron circuit are small and the transistors occupy relatively little space. Suitable heat sinks or other cooling means may be provided for the transistors, or for both the thyratrons and transistors. In case very rapid operation is desired, hydrogen thyratrons may be used.

Steps may be substantially equalized, as far as the load is concerned, by using special gearing between the motor shaft and the load. For instance, the pinion or gear on the motor shaft may have alternate short and long teeth driving a gear which rotates the load shaft. The load gear may be of similar construction. Then if the gears are so chosen that one motor gear tooth becomes effective in the driving action, for one step, the output displacements of the load may be made equal for each alternate unequal motor step. The gears may have the same number of teeth as there are steps of the motor, if desired. Any other suitable gearing, cam drives, or mechanism designed to provide equal output steps may be used. The principle of elliptical gearing or the like may likewise be employed.

What I claim is:

1. An electrical step motor comprising a plurality of stators spaced around a common axis, rotor means for each of said stators rotatable about said axis, said stators and rotors having adjacent groups of magnetizable teeth, means for supplying a tooth energizing impulse to said stators in sequence to magnetize said teeth, and means for varying the effect of said energizing impulses on the teeth of at least one of said rotors with respect to the effect on at least one other of said rotors to equalize the angular step movements of said rotor means.

2. An electrical step motor comprising a plurality of annular stators spaced around a common axis, coaxial rotor means for each of said stators rotatable about said axis, said stators and rotors having adjacent groups of magnetizable teeth, a winding around the teeth of each of said stators, means for supplying a tooth energizing impulse to said windings in sequence to magnetize said teeth, and means for varying the energizing effect on the adjacent rotor teeth of the impulses supplied to the winding around the teeth of at least one of said stators with respect to the energizing effect on the adjacent rotor teeth of the impulses supplied to the winding around the teeth of at least one other of said stators to equalize the angular step movements of said rotor means.

3. A step motor according to claim 2 having two stators.

4. A step motor according to claim 2 having at least three stators.

5. An electrical step motor comprising a plurality of annular stators spaced around a common axis, rotor means for each of said stators coaxial with said stators, said stators and rotors having adjacent groups of magnetizable teeth, a winding around the teeth of each of said stators, and means for supplying a tooth energizing impulse to said windings in sequence to magnetize said teeth, the circumferential distance between the leading edges of the teeth of each stator being substantially equal to two and one half times the circumferential width of the stator and rotor teeth.

6. A step motor according to claim 5 wherein said teeth are circumferentially spaced a greater distance apart than the circumferential width of said teeth, said spacing being proportioned to cause substantially the same overtravel of the teeth of said rotor means with respect to adjacent stator teeth for each stator, and means for holding the rotor in substantially its most forward position for each step movement thereof while preventing any appreciable movement of the rotor in the opposite direction.

7. An electrical step motor comprising a plurality of stators spaced around a common axis, rotor means for each of said stators rotatable about said axis, said stators and rotors having adjacent groups of magnetizable teeth, means for supplying a tooth energizing impulse to said stators in sequence to magnetize said teeth, and means responsive to variations in the output load on said motor for varying the magnitude of the energizing impulses supplied to the teeth of at least one of said stators with respect to the magnitude of the energizing impulses supplied to the teeth of at least one other of said stators to equalize the angular step movements of said rotor means.

8. An electrical step motor comprising a plurality of annular stators spaced around a common axis, coaxial rotor means for each of said stators rotatable about said axis, said stators and rotors having adjacent groups of magnetizable teeth, a winding around the teeth of each of said stators, means for supplying a tooth energizing impulse of current to said windings in sequence to magnetize said teeth, and means for varying the resulting magnetizing effect on the adjacent rotor teeth of the current traversing the winding of at least one of said stators with respect to the resulting magnetizing effect on the adjacent rotor teeth of the current traversing the winding of at least one other of said stators to equalize the angular step movements of said rotor means.

9. A step motor according to claim 8 wherein the position of said one stator winding is variable.

10. A step motor according to claim 8 wherein the magnitude of the current impulses traversing said one stator winding is variable.

11. An electrical step motor comprising a plurality of annular stators spaced around a common axis, coaxial rotor means for each of said stators rotatable about said axis, said stators and rotors having adjacent groups of magnetizable teeth, a winding around the teeth of each of said stators, means for supplying a tooth energizing impulse to said windings in sequence to magnetize said teeth, means mounting one of said stators for rotation about said axis, and means for adjusting the rotational position of said rotatably mounted stator to equalize the angular step movements of said rotor means.

12. A step motor according to claim 11 wherein two of said stators are rotatably mounted.

13. An electrical step motor comprising a plurality of annular stators spaced around a common axis, coaxial rotor means for each of said stators rotatable about said axis, said stators and rotors having adjacent groups of magnetizable teeth, a winding around the teeth of each of said stators, means for supplying a tooth energizing impulse of current to said windings in sequence to magnetize said teeth, means mounting one of said stators for rotation about said axis, and means responsive to the current flow in said stator windings for adjusting the rotational position of said rotatably mounted stator to equalize the angular step movements of said rotor means.

14. An electrical step motor comprising a plurality of annular stators spaced around a common axis, coaxial rotor means for each of said stators rotatable about said axis, said stators and rotors having adjacent groups of magnetizable teeth, a winding around the teeth of each of said stators, means for supplying a tooth energizing impulse to said windings in sequence to magnetize said teeth, means coupled to said motor for generating a signal in accordance with the rate of change of speed of said rotor means, and means controlled by said signal for varying the energizing impulses supplied to the winding around the teeth of at least one of said stators with respect to the energizing impulses supplied to the winding around the teeth of at least one other of said stators to equalize the angular step movements of said rotor means.

15. An electrical step motor comprising a plurality of stators spaced around a common axis, rotor means for each of said stators rotatable about said axis, said stators and rotors having adjacent groups of magnetizable teeth, means for supplying a tooth energizing impulse to said stators in sequence to magnetize said teeth, and means for varying the degree of magnetization of the teeth of at least one of said stators with respect to the degree of magnetization of the teeth of at least one other of said stators to equalize the angular step movements of said rotor means.

References Cited in the file of this patent

UNITED STATES PATENTS

| | | |
|---|---|---|
| 1,829,686 | Swendsen | Oct. 27, 1931 |
| 2,470,767 | Ellis | May 24, 1949 |
| 2,600,523 | Ellis | June 17, 1952 |
| 2,782,354 | Thomas | Feb. 19, 1957 |